United States Patent [19]

Petitgoue

[11] Patent Number: 5,096,123
[45] Date of Patent: Mar. 17, 1992

[54] LAWN SPRINKLING AND DISPENSING APPARATUS

[76] Inventor: Mark Petitgoue, 508 W. 9th St., Sterling, Ill. 61081

[21] Appl. No.: 674,948

[22] Filed: Mar. 26, 1991

[51] Int. Cl.⁵ .............................................. B05B 7/26
[52] U.S. Cl. .................................................. 239/310
[58] Field of Search .......................... 239/242, 310, 318

[56] References Cited

U.S. PATENT DOCUMENTS 2,573,687 11/1951 Brock .................................... 239/310
2,622,928 12/1952 Misch ..................................... 239/310

Primary Examiner—Andres Kashnikow
Assistant Examiner—Lesley D. Morris

[57] ABSTRACT

The invention is directed to a lawn sprinkling and fertilizer dispensing apparatus that is configured to provide an extremely stable structure that accommodates all dynamic forces present during operation of the apparatus in such a manner that turning moment forces transmitted to the apparatus via a hose connection or dynamically generated in a water sprinkling section of the apparatus are completely neutralized. The apparatus includes a water sprinkling mechanism and a fertilizer dispensing tank, with the water sprinkling mechanism including at one end thereof a liquid entry port. The fertilizer dispensing tank is a relatively flat elongated unit having an overall length greater than an overall length of the sprinkler mechanism. Additionally, the tank is substantially wider than the sprinkler mechanism width. The liquid sprinkling mechanism is secured to the tank along an upper surface of the tank such that the overall length dimension of the sprinkler is adjacent an upper tank surface edge defined by the tank's overall greatest length dimension.

5 Claims, 1 Drawing Sheet

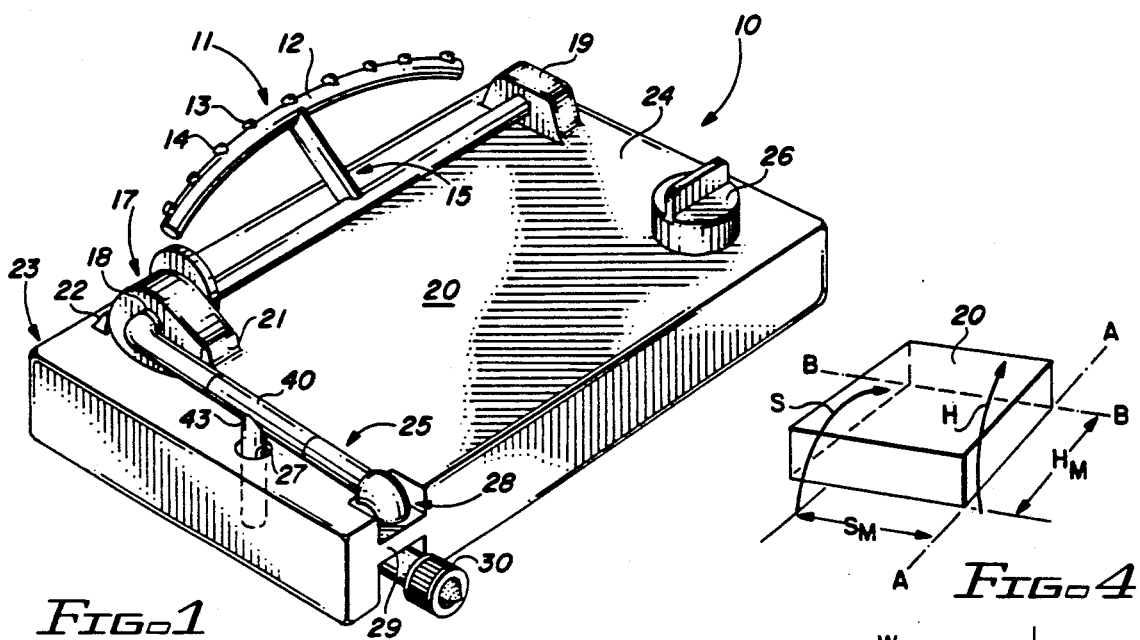
*FIG. 1*
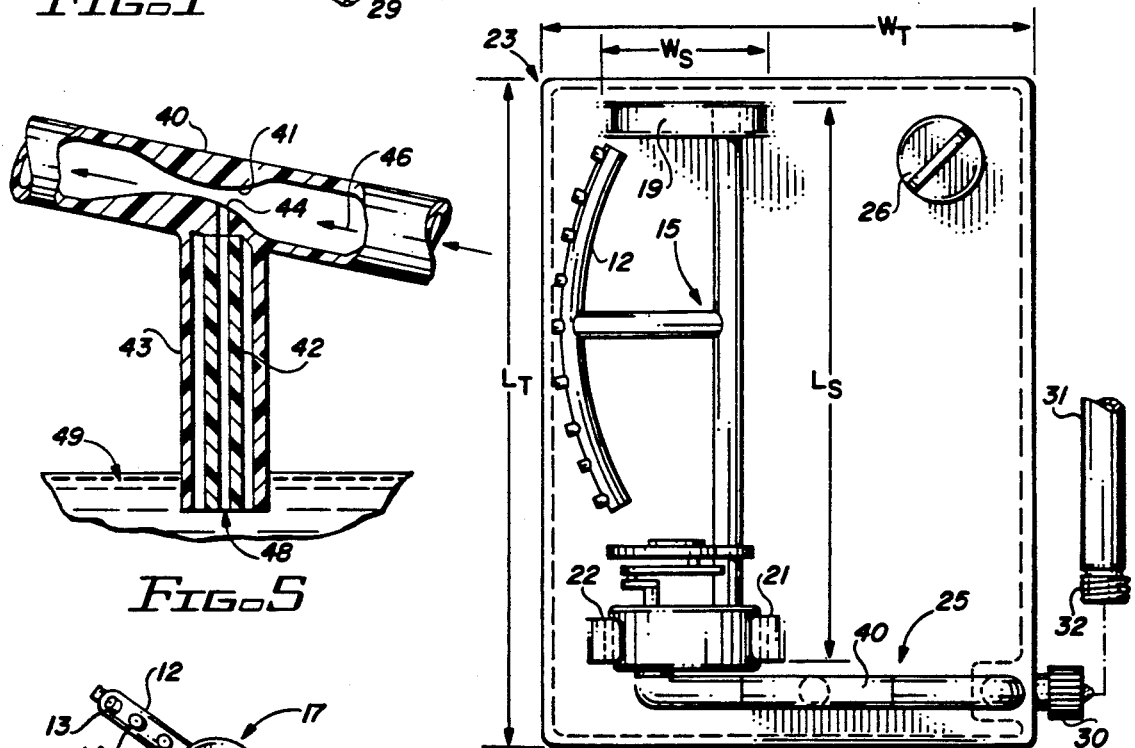
*FIG. 4*
*FIG. 5*
*FIG. 2*
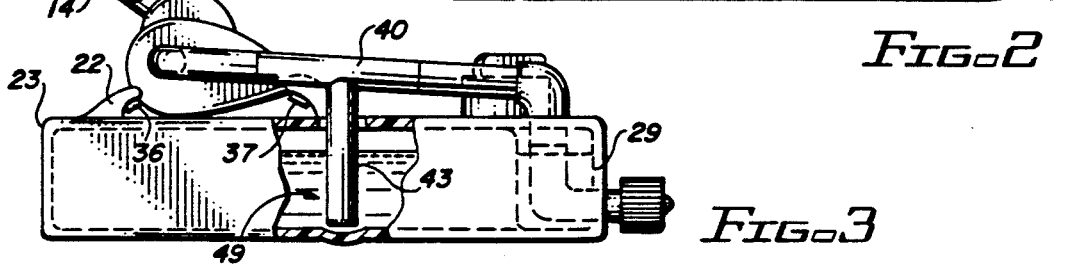
*FIG. 3*

LAWN SPRINKLING AND DISPENSING APPARATUS

TECHNICAL FIELD

This invention relates to lawn sprinkling and fertilizer dispensing apparatus.

BACKGROUND OF THE INVENTION

The art of sprinkling water on lawns to insure their verdent growth goes back many years and has provided numerous opportunities for creative minds to invent and improve a wide variety of water sprinkling methods.

Many of these approaches have provided for the effective delivery of water in a uniform fashion to a variety of configurations of lawn areas.

It is not uncommon for the users of such advanced sprinkling systems to find the sprinklers toppling over because of twists in the hoses leading to the sprinkler coupled with reaction forces generated in the sprinkler's sprinkling mechanism. When the sprinkler topples over, the user must turn the water off and make adjustments to hose and sprinkler.

This sprinkler toppling problem is exacerbated in situations where the lawn to be sprinkled is on a slope.

In addition to the advances in water sprinkling technology, there has been as of late a renewed interest in providing nutrients in the form of fertilizer to lawns during the water sprinkling process. Typical of such an effort is that which is described in U.S. Pat. No. 4,333,493 to Beiswenger et al titled "Cartridge Feeder for Soluble Fertilizer." Beiswenger et al provides a fertilizer cartridge in series with a sprinkler and intermediary a hose connected to a source of water under pressure. Beiswenger et al make no provision for a unitary sprinkler and fertilizer dispenser that prevents sprinkler toppling as will be seen as being present in the invention to be described more fully hereinafter.

A popular approach today employed to fertilize and water a lawn at the same time will be found in a variety of hand-held fertilizer dispensing bottles that have integrally formed in the caps of these containers nozzles that allow the water under pressure to draw fertilizer from the bottle and combine the same with the water which the nozzle delivers to sprinkle a lawn.

Those individuals that employ such hand-held apparatus soon tire from the watering and lawn feeding effort, especially when a lawn has a large area to be treated. Those who have tried to place such a hand-held apparatus on the ground are frequently tortured by the inability to stop the nozzle and bottle from thrashing around.

The invention now to be described completely overcomes the deficiencies noted above and does so in a manner that is simple and inexpensive.

DISCLOSURE OF INVENTION

More specifically the invention is directed to a lawn sprinkling and fertilizer dispensing apparatus that is configured to provide an extremely stable structure that accommodates all dynamic forces present during operation of the apparatus in such a manner that turning moment forces transmitted to the apparatus via a hose connection or dynamically generated in a water sprinkling section of the apparatus are completely neutralized.

The apparatus includes a water sprinkling mechanism and a fertilizer dispensing tank.

The water sprinkling mechanism includes at one end thereof a liquid entry port. The fertilizer dispensing tank is a relatively flat elongated unit having an overall length greater than an overall length of the sprinkler mechanism. Additionally, the tank is substantially wider than the sprinkler mechanism width.

The liquid sprinkling mechanism is secured to the tank along an upper surface of the tank such that the overall length dimension of the sprinkler is adjacent an upper tank surface edge defined by the tank's overall greatest length dimension.

The apparatus further includes a liquid transfer conduit that is in fluid communication at one end thereof with the liquid entry port of the water sprinkler mechanism. The other end of the liquid transfer conduit is designed to be coupled to a source of water under pressure. The end of the liquid transfer conduit adapted to be coupled to a source of water under pressure is positioned physically below the tank's upper surface and above a lower support surface of the tank. This just recited conduit end is also positioned along a tank edge remote from the upper tank surface edge.

The liquid transfer conduit is further characterized by the integral inclusion therewith of siphon unit that is in communication with the tank's interior and provides for delivery of the tank's interior contents to be dispensed along with water by the sprinkling mechanism.

It is therefore a primary object of this invention to provide a structurally stable fertilizing dispensing tank and water sprinkler that neutralizes undesirable sprinkler toppling forces while efficiently delivering water bearing nutrients to a variety of topographically differing lawn environments.

Other objects of the present invention will be apparent upon reference to the accompanying description when taken in conjunction with the following drawings.

BRIEF DESCRIPTION OF DRAWINGS

FIG. 1 is a three dimensional illustration of a lawn sprinkling and fertilizer dispensing apparatus embodying the invention, FIG. 2 is a top view of the apparatus of FIG. 1, FIG. 3 is an end view of the apparatus of FIG. 1, FIG. 4 is a schematic illustration of turning moment forces experienced by the invention, and FIG. 5 is a partial section of a tank interior liquid delivery siphoning unit.

BEST MODE FOR CARRYING OUT THE INVENTION

Reference is now made to FIG. 1 which illustrates a preferred embodiment of the invention and which shows in three dimensional form a lawn sprinkling and fertilizer dispensing apparatus 10. A lawn sprinkling mechanism 11, which may take on a variety of configurations, is patterned after a well known lawn sprinkler manufactured by Gilmour "Wide Area Coverage Model". It is to be understood that the claimed invention contemplates that there may be a number of different water sprinkling mechanisms that could be employed beneficially in the practice of the invention. The lawn sprinkling mechanism 11 is characterized by having at one end thereof a liquid entry port 18. In other respects, the sprinkler mechanism 11 is typical in that it includes an oscillating sprinkling head 12 which includes sprinkling nozzles 13, 14, two of which have been referenced. The head 12 is integrally connected to a "T" shaped water and fertilizer delivery conduit 15. The conduit is supported for rotation at one end by a sprinkler end support unit 19 in the manner shown. The support unit 19 is integrally formed from a portion of a dispensing tank 20. The other end of the conduit 15 is drivingly connected in a manner not shown to the water driven rotary to oscillating movement mechanism 17.

The dispensing tank 20 is provided with a pair of preformed raised clamp elements 21,22 which cooperate with a pair of sprinkler mechanism support tabs 36,37 (see FIG. 3) such that the entire lawn sprinkling mechanism 11 may be manually slipped between and under the clamp elements 21,22 during assembly or removed in the same manner for purposes of repair.

At the end of the lawn sprinkling mechanism 11 where the liquid entry port 18 is located, there is depicted a water driven rotary to oscillating movement mechanism 17. A complete explanation of the internal operation and details of construction of the oscillating movement mechanism 17 will not be set forth as such details do not form a part of the invention. It is sufficient to state that lawn sprinkling mechanisms of the type depicted routinely experience an unbalanced dynamic force brought about by the cooperation of water under pressure entering the mechanism and the internal workings of the rotary to oscillating movement components of the mechanism. The unbalance force tends to bring about the toppling of the entire lawn sprinkling mechanism.

The just described unbalance force is neutralized by the structural arrangement now to be described.

It will be observed when FIG. 1 is viewed that the lawn sprinkling mechanism 11 is disposed in a manner that it parallels an upper tank surface edge 23 of the tank 20 upper surface 24. A relationship exists between a length $L_T$ of the tank and a longest overall length dimension $L_S$ of the water sprinkling mechanism 11. The length $L_T$ is longer than $L_S$. The tank width $W_T$ is substantially wider than a longest overall width dimension $W_S$ of the liquid sprinkling mechanism as will be observed when FIG. 1 is studied, the tank 20 has a depth dimension substantially less than the tank's largest dimension $L_T$.

A liquid transfer conduit generally indicated at 25 has one end integrally coupled in fluid communication to the liquid entry port 18 of the water driven rotary to oscillating movement mechanism 17. The other end of the liquid transfer conduit 25 is characterized by the presence of a female hose connection 30. In FIG. 2 there is shown a hose 31 having a threaded male hose connection 32 spaced from the female connection 30. The connections 30, 32 are joined in a conventional fashion when the invention is in operation.

A tank refill cap 26 is depicted in place on the tank 20 upper surface 24. A tank opening 27 is provided to receive an exterior suction tube shield 43 as shown most clearly in FIGS. 1 and 3.

A "T" shaped tank interior liquid delivery siphon unit 40 is best shown in FIGS. 1, 3 and 5. In FIGS. 1 and 3 it will be observed that the siphon unit 40 has a vertical, downwardly disposed exterior suction tube shield 43 which protects a tank interior suction tube 42.

Reference is now made to FIG. 5 which illustrates in partial section the "T" shaped tank interior liquid fertilizer siphon unit 40. The siphon unit 40 includes a venturi of conventional design having a venturi throat 41 as indicated. A venturi throat passage 44 communicates with the suction tube 42 fitted as shown into a portion of the venturi. The operation of the venturi is typical of such arrangement, namely, water indicated by arrows 46,47 passes through the venturi throat 41 which causes a negative pressure to be present at the venturi throat passage 44 which causes a lower end 48 of suction tube 42 to draw a fertilizer solution 49 upwards through the suction tube 42 where it is mixed with a flow of water passing through the venturi throat 41.

Referring again to FIG. 1 and tank 20, it is contemplated that the tank may be made of injection molded plastic which readily provides for a liquid transfer conduit hose end containment section 28 to be integrally formed in the tank 20. With the transfer tube 25 not present, as is the case during assembly, a tank wall restraining strap 29 is fashioned from an exterior wall of the tank. The restraining strap 29 is not unlike a plastic jug finger loop handle found in commercially available milk jugs.

FIG. 4 illustrates in schematic form the various sprinkler and hose toppling forces experienced at the tank 20. A sprinkler turning moment force S acting over sprinkler moment arm $S_M$ about line AA, and a hose turning moment force H acting over hose moment arm $H_M$, are effectively neutralized by the apparatus of the subject invention.

Although this invention has been illustrated and described in connection with the particular embodiment illustrated, it will be apparent to those skilled in the art that various changes may be made therein without departing from the spirit of the invention as set forth in the appended claims.

I claim:

1. A lawn sprinkling and dispensing apparatus including in combination;

a liquid sprinkling means having at an end thereof a liquid entry port, a dispensing tank having an overall length greater than a longest overall length dimension of said liquid sprinkling means and a tank width substantially wider than a longest overall width dimension of said liquid sprinkling means, said liquid sprinkling means secured to said tank along an upper surface of said tank such that said overall length dimension of said sprinkler is adjacent an upper tank surface edge defined by said tanks overall greatest length dimension, and a liquid transfer conduit means in fluid communication at one end thereof with said liquid entry port of said sprinkler and at another end thereof said conduit is adapted to be coupled to a source of liquid under pressure, said other end of said conduit being positioned physically below said tank's upper surface and above a lower support surface of said tank, said conduit other end further being positioned along a tank edge remote from said upper tank surface edge, said liquid transfer conduit means including a tank interior liquid delivery means in communication with an interior region of said tank and contents of said tank to be dispensed to thereby deliver to said sprinkling means a mixture of said tank contents to be dispensed to thereby deliver to said sprinkling means a mixture of said tank contents and said source of liquid under pressure.

2. The sprinkling and dispensing apparatus of claim 1 wherein said tank has a depth dimension substantially less than said tank's longest dimension.

3. The sprinkling and dispensing apparatus of claim 2 wherein said tank includes means integrally formed into said tank to receive and position said liquid transfer conduit means relative to said liquid entry port of said sprinkling means and said lower tank support surface.

4. The sprinkling and dispensing apparatus of claim 3 wherein said tank includes in said upper tank surface an opening to thereby allow said tank interior liquid delivery means to pass to said tank's interior to provide said communication with contents of said tank to be dispensed.

5. The sprinkling and dispensing apparatus of claim 4 wherein said sprinkling means is of an oscillating sprinkling type.

* * * * *